US004001611B2

United States Statutory Invention Registration [19]

[11] Reg. Number: H1611

Patel

[45] Published: Nov. 5, 1996

[54] GLYCOLS AS INTERNAL PHASE IN OIL WELL DRILLING FLUIDS

[75] Inventor: Arvind D. Patel, Houston, Tex.

[73] Assignee: M-I Drilling Fluids Company, Houston, Tex.

[21] Appl. No.: 147,743

[22] Filed: Nov. 4, 1993

[51] Int. Cl.[6] ..... C09K 7/06

[52] U.S. Cl. ..... 507/103; 507/139

[58] Field of Search ..... 507/103, 139

[56] References Cited

U.S. PATENT DOCUMENTS

| | | | |
|---|---|---|---|
| H1,000 | 12/1991 | Patel et al. | 507/103 |
| 2,222,949 | 11/1940 | Henker et al. | 255/1 |
| 2,316,967 | 4/1943 | Miller | 252/8.5 |
| 2,316,968 | 4/1943 | Miller | 252/8.5 |
| 2,698,833 | 1/1955 | Wilson | 252/8.5 |
| 3,842,703 | 10/1974 | Okamoto et al. | 84/1.27 |
| 4,631,136 | 12/1986 | Jones III | 252/8.5 |
| 4,787,990 | 11/1988 | Boyd | 252/8.511 |
| 4,830,765 | 5/1989 | Perricone et al. | 252/8.51 |
| 4,876,017 | 10/1989 | Trahan et al. | 507/103 |
| 5,045,219 | 9/1991 | Trahan et al. | 507/103 |
| 5,072,794 | 12/1991 | Hale et al. | 175/50 |
| 5,096,883 | 3/1992 | Mercer et al. | 507/103 |
| 5,189,012 | 2/1993 | Patel et al. | 507/103 |

FOREIGN PATENT DOCUMENTS

| | | | |
|---|---|---|---|
| 0374671A1 | 12/1989 | European Pat. Off. | C09K 7/06 |
| 0449257A2 | 10/1991 | European Pat. Off. . | |
| 3842659 | 6/1990 | Germany . | |
| 2223255 | 4/1990 | United Kingdom . | |
| 2251447 | 7/1992 | United Kingdom . | |
| WO94/16030 | 7/1994 | WIPO . | |

OTHER PUBLICATIONS

European Search Report for Application No. 94117442.7.

*Primary Examiner*—Charles T. Jordan
*Assistant Examiner*—John R. Hardee
*Attorney, Agent, or Firm*—Arnold, White & Durkee

[57] ABSTRACT

An emulsion and emulsion drilling fluid are disclosed. The emulsion has utility as an oil based drilling fluid comprising a glycol emulsified in a synthetic hydrocarbon material. The synthetic hydrocarbon material has an average molecular weight of from about 120 to 1,000 and is synthesized from one or more olefinic monomers having a chain length of $C_2$ to $C_{14}$.

22 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GLYCOLS AS INTERNAL PHASE IN OIL WELL DRILLING FLUIDS

BACKGROUND OF THE INVENTION

The invention relates to improved drilling fluids used in the drilling of subterranean oil and gas wells as well as other drilling fluid applications and drilling procedures. The invention is particularly concerned with non-polluting, minimally toxic drilling fluids.

In rotary drilling there are a variety of functions and characteristics that are expected of a drilling fluid ("drilling mud" or simply "mud"). The drilling fluid is expected to carry cuttings from beneath the bit, transport them up the annulus, and permit their separation at the surface while at the same time the rotary bit is cooled and cleaned. A drilling mud is also intended to reduce friction between the drill string and the sides of the hole while maintaining the stability of uncased sections of the borehole. Likewise the drilling fluid is formulated to prevent unwanted influxes of formation fluids from permeable rocks penetrated and likewise to form a thin, low permeability filter cake which seals pores and other openings and formations penetrated by the bit. Finally, the drilling fluid is used to collect and interpret information available from drill cuttings, cores and electrical logs.

Drilling fluids are typically classified according to their base material. In water based muds, solid particles are suspended in water or brine. Oil can be emulsified in the water. Nonetheless, the water is the continuous phase. Oil based muds are exactly the opposite. Solid particles are suspended in oil and water or brine is emulsified in the oil and therefore the oil is the continuous phase. The final class of drilling fluids are pneumatic fluids in which drill cuttings are removed by a high velocity stream of air or natural gas.

On both offshore and inland drilling barges and rigs, drill cuttings are conveyed up the hole by a drilling fluid. Water based drilling fluids may be suitable for drilling in certain types of formations; however, for proper drilling in other formations, it is desirable to use an oil base drilling fluid. With an oil base drilling fluid, the cuttings, besides ordinarily containing moisture, are necessarily coated with an adherent film or layer of oily drilling fluid which may penetrate into the interior of the cuttings. This is true despite the use of various vibrating screens, mechanical separation devices and various chemical and washing techniques. Because of pollution to the environment, whether on water or on land, the cuttings cannot be permanently discarded until the pollutants have been removed.

Another method to accomplish the pollutant removal has been placing the screened cuttings in a standpipe or other vessel filled with sea water and periodically skimming off the layer of displaced oil as it rises to the surface in the vessel. Another method attempted is burning, i.e., oxidatively incinerating, the oil from the cuttings. Still another method is physically transporting the oily cuttings to a remote site for subsequent disposal. In each instance the method of disposal of the cuttings has proved ineffective and inefficient.

The problems associated with the environmental compatibility of drill cuttings, and the chemicals contained therein, has long been recognized as a problem in the oil and gas exploration industry. Typically the approaches for solving the environmental compatibility problems have involved the physical treatment of the drill cuttings, see for example U.S. Pat. No. 4,208,285 wherein an apparatus is provided for removing volatile materials from drill cuttings by vaporizing the materials on the cuttings in a non-oxidative atmosphere and U.S. Pat. No. 4,387,514 which provides a method and apparatus for drying oil well drill cuttings to eliminate pollution causing organic materials from the cuttings.

It is apparent to anyone selecting or using a drilling fluid for oil and gas exploration that an essential component of a selected fluid is that it be properly formulated to achieve the necessary characteristics for the specific end application. As stated hereinabove, the typical compositions include oil based muds, water based muds and pneumatic fluids. For purposes of this application, pneumatic fluids are not relevant. The vast majority of oil and gas exploration is done with water based muds. The primary reason for this preference is price and environmental compatibility. Oil based muds are substantially more expensive than water based drilling fluids, and are also environmentally incompatible. As a result, the use of oil based muds has been historically limited to those situations where they are necessary.

This long felt need in the oil and gas exploration industry for an environmentally acceptable drilling fluid which either is an oil based drilling fluid or performs as an oil based drilling fluid has now been achieved by applicants' invention. By use of applicants' invention and the use of synthetic hydrocarbons the functional characteristics of an oil based drilling fluid system are achieved while the environmental compatibility of conventional water based systems is attained. Such a result has until recently been thought theoretically and practically impossible.

Various advantages of using oil based drilling mud in the rotary drilling of boreholes in the earth have been known for some time. In summary, it can be said that under certain conditions, one or more of the following advantages make oil based muds more desirable than water based muds. Lubricity characteristics are excellent. Drilling fluids weighing less than about 8 pounds per gallon can be prepared with an oil based mud, and have proved advantageous in certain special drilling and coring situations. The penetration of the formation by water is avoided. Cores can be recovered in an in situ condition, and in the presence of hydrous clays and bentonites, no swelling or sloughing is experienced to reduce porosities or cause pipe sticking difficulties. There are fewer problems with hydrophilic shale formations drilled. Evaporite sections such as salt zones can be drilled with minimal leaching of the salt. Furthermore, oil based muds can be formulated to withstand temperatures up to 500 degrees Fahrenheit.

The principal difficulties encountered in the use of oil based drilling fluids are probably those of handling, fire hazard, environmental unacceptability and the intrinsic cost per barrel, since oil is much more expensive than water. Some materials which heretofore have been added to oils in order to produce satisfactory drilling muds have been of an intense black color, e.g., carbon black and asphalt of various kinds, and oilfield workers have a strong resistance to handling such materials. Not just any material can be added to an oil for the purpose of making a drilling mud, because the material to be added must not only increase the viscosity, though not to too great an extent, and decrease the fluid loss, but must also be dispersable in the oil, and above all must not be of such a nature as to clog the formations drilled through.

In addition, oil based muds offer potential advantages; better lubricating qualities, higher boiling points, and lower freeze points. Because of the cost of preparing an oil mud is always more than that of the same density water muds, the economic justification for selecting an oil mud must come from its superior performance under the particular conditions of use.

There is, however, strong sentiment that although the initial differential cost of oil based muds versus aqueous based muds favors aqueous based, as the well is drilled deeper and as drilling operations last longer, the oil based muds actually become more economical due to the fact that the constituents do not have to be replenished as often and the fact that the oil based muds are reusable for substantially longer periods of time.

As can be seen from the above, the development of a drilling fluid that exhibits desirable characteristics of both a water based and oil based drilling fluid has long been an unachieved goal of the oil and gas exploration industry. With the practice of applicants' invention this goal has been realized.

PRIOR ART

In the drilling of wells to recover hydrocarbons and gas from subterranean deposits, it is common practice to use a rotary drilling procedure. The drill bit cuts into the earth, causing the cuttings to accumulate as drilling continues. The drilling fluid is used to carry these cuttings to the surface where they are separated and removed. The drilling fluid is recirculated through the drill pipe at the drill bit to carry out new cuttings. Thus, the bottom of the hole is kept clean and free of cuttings at all times.

Although aqueous-based drilling fluids which utilize water, brine or sea water as the primary liquid phase are dominant throughout much of the drilling industry, various oil based drilling fluids have been developed and are used in the field. These oil based drilling fluids utilize hydrocarbons such as diesel and mineral oils as the continuous phase. Normally, five to seventy percent of the aqueous phase is emulsified in the hydrocarbon phase utilizing suitable emulsifiers and wetting agents in these fluids. Oil based drilling fluids are also commonly known as oil muds. The use of oil muds is quite common in high temperature wells and wells with troubled shale zones.

The oil muds exhibit desirable rheological properties over a wide range of temperatures in which they are utilized. Also, oil muds typically have excellent lubricity properties in comparison to water based muds, which reduces sticking of the drill pipe due to a reduction in frictional drag. Since few if any oil wells are truly vertical there is always frictional contact between the drill string and borehole. Frictional contact requiring excess torque output from motors is undesirable. The lubricating characteristics ("lubricity") of the drilling mud provides the only known means for reducing the friction. Oil muds in general have better lubricity than water based muds. Additionally, the oil based muds are beneficial to shale stabilization, corrosion inhibition, and fluid loss control.

Although oil based muds have performance characteristics distinct from water based muds, some of which are considered advantageous, there are various disadvantages such as cost, fire hazard, difficulty of mixing the mud, and environmental incompatibility effects. Among the disadvantages characteristic of oil muds, the single overriding detrimental effect is the environmental pollution effect associated with both onshore and offshore drilling operations. The cleanup of accidental discharge of oil muds in offshore environments is expensive and necessary due to toxicity of oil muds to aquatic life. Currently, in the U.S., cuttings drilled using oil based muds are required to be disposed of in an environmentally acceptable fashion, most of which are more expensive and more inconvenient than disposal methods for water based drilling fluids.

Such oil based drilling fluids are described, for instance, in U.S. Pat. Nos. 2,222,949, 2,316,967, 2,316,968 and 2,698,833. These patents describe the use of non-aqueous drilling fluids using diesel oil as the carrier or continuous phase. Several other publications describe the use of mineral oils for low toxicity oil muds. However, mineral oils that were once considered to be toxicologically and environmentally superior to diesel oil, are now also considered to be relatively toxic under increasingly stringent environmental regulations. Several attempts to develop modified non-polluting fluids have been made (U.S. Pat. Nos. 4,631,136; 4,830,765). These are not true hydrocarbon fluids and require an aqueous continuous phase which does not provide desirable functional characteristics, for instance, shale stability derived with oil based muds.

Strict regulations are imposed by governmental regulatory agencies especially in light of what are generally viewed as environmental disasters involving oil spills. These regulations have not only made the use of oil based drilling fluid more costly but in some places difficult or impossible to use in compliance with regulatory guidelines. Environmental concerns have prompted the development of a new environmentally acceptable drilling fluid. This drilling fluid is designed to be essentially non-polluting, non-toxic and safe to aquatic life. Pollution is usually defined as a sheen, film or discoloration of surface water formed by drilling fluids. The U.S. Environmental Protection Agency ("EPA") has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis Bahia)" 1984 EPA-600/3-84- 067.

It has been known for some time that synthetic water-dispersable polymers can be used as drilling fluid components. In general, acrylic polymers and alkaline oxide polymers have been described as being useful in drilling muds. See Darley and Gray, "Composition and Properties of Drilling and Completion Fluids," Gulf Publishing Co., Fifth Edition, pgs. 576–580. However, no prior art disclosure mentions or appreciates the essential molecular weight and chain length requirements of applicants' invention. The prior art materials do not possess the essential toxicity and environmental compatibility of applicants' invention.

U.S. Pat. No. 4,876,017 issued Oct. 24, 1989 discloses a synthetic hydrocarbon compound, in particular polyalphaolefin, to be used in a water based drilling fluid as a downhole lubricant. According to the disclosure, the resulting material is non-toxic to marine life and does not produce a sheen on a water surface when dumped into a body of water. The compound also serves as a spotting fluid for the removal of lodged tools downhole. U.S. Pat. No. 4,876,017 does not disclose or appreciate that an oil based invert emulsion capable of suspending weight materials and stable under downhole temperature and pressure conditions can be made from synthetic hydrocarbons as described in applicants' invention.

Other prior art of which applicant is aware includes U.S. Pat. No. 5,189,012 which is commonly assigned. The text of U.S. Pat. No. 5,189,012 is hereby incorporated by reference. Other prior art of which applicant is aware includes U.S. Pat.

Nos. 2,316,968; 4,787,990; 5,096,883; 3,842,703; EP-037-04671; and DE- 3,842,659.

THE FIGURES

FIGS. 1, 2 and 3 are graphic representations of Huxley-Bertram HTHP viscometer data using the glycol-containing drilling fluids of this invention. This is a well recognized procedure and apparatus developed by Huxley-Bertram Engineering of Cambridge, the United Kingdom.

The HTHP viscometer measures the rheological properties of drilling mud, and other drilling fluids, under simulated "down hole" conditions. The viscometer is of the rotating type and measures viscosity at up to 15000 psi and 300° C. During operation the temperature, pressure, shear rate and shear stress are displayed and recorded on a chart.

SUMMARY OF THE INVENTION

The present invention relates to an essentially non-polluting, substantially non-toxic drilling fluid composed of one or more glycols emulsified as the internal phase of an oil based continuous phase. The fluid of this invention will sometimes be referred to as an emulsion or an emulsion drilling fluid. For purposes of this application the terms are used interchangeably. Typically, the continuous phase is a synthetic hydrocarbon. In its most preferred embodiment the glycol is propylene glycol. As a beneficial result of the use of this invention, small amounts of water or brine may be tolerated in the internal phase of the continuous phase. In certain preferred embodiments emulsifiers, such as polymeric polyalkylene carboxylate emulsifiers are utilized as the primary emulsifier and other wetting agents and supplemental emulsifiers can be used to make the glycol-in-oil emulsion necessary for the practice of this invention.

Mere substitution of an ester for the oil phase of conventional emulsified drilling fluids does not satisfy the simultaneous requirements of shale inhibition, low toxicity, and biodegradability. This is because high salt concentrations required in the aqueous phase for chemical activity suppression still render these systems unacceptably toxic to land plants and some marine life. Similarly, incorporation of polyalcohols into emulsions with petroleum based oils does not produce a drilling fluid which satisfies the low toxicity and biodegradability requirements because of the presence of the petroleum oils. Also the incorporation of polyalcohols into fatty acid esters based fluids have their own limitations such as lime tolerance, hydrolytic and temperature instability.

Additionally, the emulsifier marketed by ICI, Ltd. under the trade names D-477 and E-464 have shown specific utility in the practice of this invention. Fluid loss should be reduced with up to 25 lbs per barrel (71.4 grams per liter) gilsonite or oxidized asphalt or up to 25 lbs per barrel (71.4 grams per liter) organophilic lignite, or other fluid loss control additive, each separately or in combination. Gel strength can be augmented with organophilic clay, up to 20 lbs per barrel (57.1 grams per liter) or with polymeric viscosifiers, such Allied Colloids D-247. Chemical scavengers, such as zinc oxide can be added as necessary to remove hydrogen sulfide by producing insoluble zinc sulfide. Calcium hydroxide can be used as a sulfide scavengers and for carbon dioxide treatment. Calcium hydroxide can also be used as needed to maintain the alkalinity unlike limitations in U.K. patent application GB 2,251,447.

The alcohol of the present invention is suitably any alcohol of less than eight hydroxyl groups and less than 16 carbon atoms. Glycerine and propylene glycol are the preferred embodiments. Other suitable exemplary alcohols include 1,3 propanediol, water soluble polyglycerol or polyglycol. The glycerol or glycol is present in the continuous phase in a volume of up to 70%, preferably up to 40%, and most preferably from 2% to 30%.

The advantage of using alcohols in the internal phase is that ionic character of the internal phase is no longer required. If no water is present in the system, the hydration of shales is greatly reduced. That is not to say that the alcohols do not interact with the clays of shale. It is known that alcohols such as ethylene glycol can interact with the clay lattice and cause a separation of the clay platelets. However, the amount of swelling observed is significantly less than that observed for water (typically less than 1 percent). Also, the brine used as the internal phase is toxic and some environmental concerns occur during on-shore drilling operations.

Oils such as diesel or mineral oils produced directly or indirectly from petroleum crude oil have traditionally been used as the base oils for oil based drilling fluids. These oils contain a large variety of hydrocarbon compounds including aromatics and straight chain paraffins. The absence of these and the uniformity of the carbon numbers distinguish the synthetic hydrocarbon oils of this invention from petroleum derived oils.

The major disadvantage of these more conventional emulsified drilling fluids are that the petroleum-derived oils which they contain are often toxic to marine organisms, cause skin irritation in humans and animals, and are slow to biodegrade. Furthermore, the inorganic salts required for chemical activity depression of the water phase are toxic to land plants and inhibit biodegradation of the drilling fluid.

The synthetic hydrocarbon oils of this invention are manufactured by oligomerizing alpha-olefins or other olefins. The resulting materials are mixtures of branched hydrocarbon molecules with carbon numbers that are even multiples of the base olefin. For instance, a synthetic hydrocarbon made from C-8 olefins contain only molecules that are $C_8$, $C_{16}$, $C_{24}$, $C_{32}$, etc. These oils can be hydrogenated to achieve complete saturation, or partially hydrogenated, or left unhydrogenated. Preferably they contain no aromatics. Since these oils are synthetic materials, their molecular size and structure, and hence their performance characteristics, can be controlled in a predictable and understandable manner. The synthetic hydrocarbon oils of this invention can be unhydrogenated, partially hydrogenated, or hydrogenated.

The glycols used to make invert emulsions of this invention are water soluble and environmentally compatible. They can tolerate contamination with water and brine encountered in drilling operation.

Prior to the present invention, it was not obvious that (1) the synthetic hydrocarbon oils would make stable invert emulsions with water soluble glycols and that these invert emulsions could be treated to suspend solids; (2) the suspensions would remain stable under the temperature and pressure conditions encountered during drilling subterranean oil and gas wells; and (3) the resulting muds would have favorable toxicity characteristics.

The subject synthetic hydrocarbons are pure and minimally toxic to aquatic plant and animal life. The primary embodiment of this invention include drilling fluids in which the synthetic hydrocarbon comprises the continuous phase of an oil based drilling fluid in which water soluble glycols such as propylene glycol and glycerine are emulsified.

The drilling fluid compositions of this invention are improved compositions for use offshore and onshore due to their minimal toxicity. These compositions are stable drilling fluids which are effective replacements for conventional oil muds. Mysid shrimp are used in bioassay tests of laboratory prepared drilling fluids containing the synthetic hydrocarbons and have shown excellent survivability.

The improved drilling fluid of this invention exhibits the functional characteristics of an oil based drilling fluid and the environmental compatibility of most water based drilling fluids. Specifically, the improved drilling fluid of this invention is characterized by improved toxicity and pollution characteristics in comparison with conventional oil based drilling fluids and specifically improved lubricity and stability in comparison with water based drilling fluids.

In alternate embodiments of this invention, the improved drilling fluid can include wetting agents, viscosifiers and other materials common to the development and formulation of drilling fluids. As mentioned hereinabove, it is essential that the drilling fluid that is selected and formulated for use in any particular well application be balanced to the conditions of the well. Therefore, although the base ingredient remains the same, i.e., glycol-in-synthetic hydrocarbon, other components can be added.

DESCRIPTION OF THE PREFERRED EMBODIMENT

Figure 1:
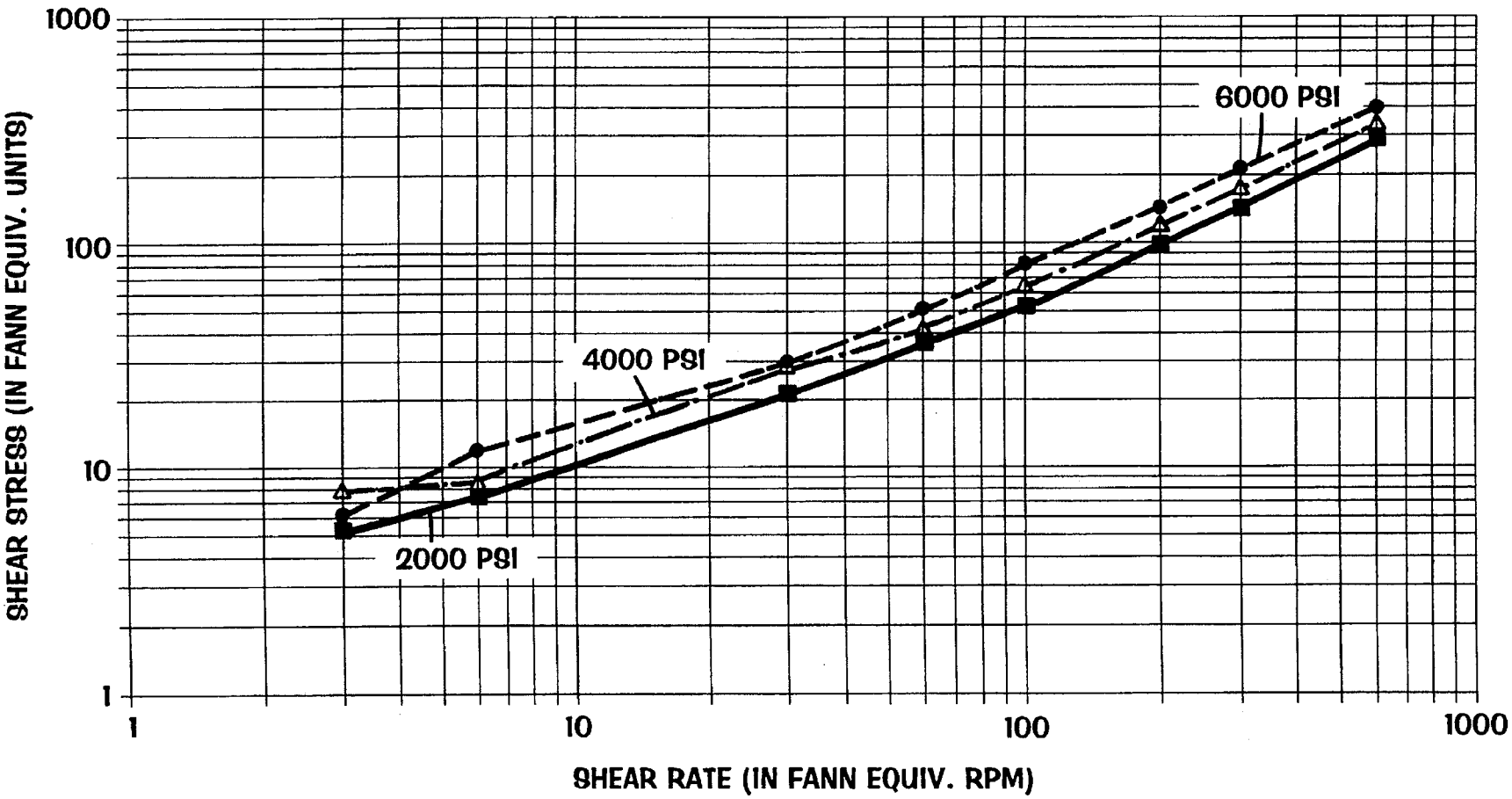

The present invention relates to non-toxic, oil based drilling fluids, wherein water soluble glycol is emulsified in synthetic hydrocarbon, which are functionally capable of carrying out additional functions such as a spotting fluid, packer-fluid, completion fluid, lubricant and coring fluid. The drilling fluid compositions of the present invention can be modified according to the end use of the fluid using suitable emulsifiers, viscosifiers, density materials and supporting agents. The invention can be used in high temperature geothermal areas as well as in conventional well settings.

The following table indicates the preferred olefinic compounds from which the branched chain oligomeric and polymeric synthetic hydrocarbon can be manufactured.

| Carbon Atoms | Compound |
|---|---|
| $C_2$ | Ethylene |
| $C_3$ | Propene |
| $C_4$ | Butene-1, Isobutene |
| $C_5$ | Pentene |
| $C_6$ | Hexene |
| $C_7$ | Heptene |
| $C_8$ | Octene |
| $C_9$ | Nonene |
| $C_{10}$ | Decene |
| $C_{12}$ | Dodecene |
| $C_{13}$ | Tridecene |
| $C_{14}$ | Tetradecene |

Various synthetic hydrocarbons are commercially available for use in the present invention. For example, polypropenes from AMOCO Chemical Company, product numbers #9009 and 9011; Chevron Chemical Company's product identified as Polymer-560; polybutenes Indopol L-14 and H-15 offered by AMOCO Chemical Company, as well as dimeric, trimeric and tetrameric 1-decenes from Emery, Ethyl and Chevron Corporations are suitable for the present invention. These synthetic hydrocarbons can also be blended to achieve the desired chemical characteristics, which are determined according to the end use of the product.

As identified hereinbefore the synthetic hydrocarbons that are believed to be useful in the practice of this invention are characterized by chain length and molecular weight parameters. Useful synthetic hydrocarbons are branched chain oligomers synthesized from one or more olefins containing a $C_2$ to $C_{14}$ chain length and wherein the oligomers have an average molecular weight of from 120 to 1000. In the preferred embodiments of this invention the synthetic hydrocarbons are branched chain oligomers synthesized from one or more olefins containing a $C_3$ to $C_{12}$ chain length and wherein the oligomers have an average molecular weight of from 160 to 800. In the most preferred embodiments of this invention the synthetic hydrocarbons are branched chain oligomers synthesized from one or more oligomers containing a $C_4$ to $C_{14}$ chain length and wherein the oligomers have an average molecular weight of 200 to 600.

In each instance the synthetic hydrocarbon mixture must have performance and viscosity characteristics that permit functional utility as a drilling fluid. In its broadest form the synthetic hydrocarbon mixture should have a viscosity of from 1.0 to 6.0 centistokes, preferable a viscosity of from 1.5 to 4.0 centistokes and most preferably from 1.5 to 3.5 centistokes. The synthetic hydrocarbons of the present invention may be hydrogenated (saturated), partially hydrogenated or non-hydrogenated.

The interfacial tension between oil and water soluble glycol is very high, so if the liquids are mixed together they mechanically separate immediately when the agitation ceases, to minimize the interfacial area. Lowering the interfacial tension with a surfactant enables one liquid to form a stable dispersion of fine droplets in the other. The lower the interfacial tension, the smaller the droplets and the more stable the emulsion. In most emulsions, oil is the dispersed phase and water is the continuous phase. However, in "invert emulsions" in which water is the dispersed phase, a suitable emulsion can be formed upon the use of a suitable emulsifier.

Whether an oil-in-water or water-in-oil emulsion is formed depends on the relative solubility of the emulsifier in the two phases. Thus, a preferentially water soluble surfactant, such as sodium oleate, will form an oil-in-water emulsion because it lowers the surface tension on the water side of the oil-water interface, and the interface curves toward the side with the greater surface tension, thereby forming an oil droplet enclosed by water. On the other hand, calcium and magnesium oleates are soluble in oil, but not in water, and thus form water-in-oil emulsions.

An invert glycol-in-oil emulsion has oil as the continuous phase. The compositions of this invention may comprise 99% oil by volume of the total composition. Water soluble glycol is normally added in these compositions. Water may be added to the drilling fluid up to a volume of 80% of glycol. In more preferred embodiments water is added from 5% to 65% by volume and in the most preferred embodiment water is added from 5% to 50% by volume of glycol.

The compositions of one embodiment of this invention require emulsifiers to incorporate the glycol into the synthetic hydrocarbon continuous phase. Various emulsifiers are available for this application. The emulsifiers are chemical compounds which have both oleophilic and hydrophilic parts. The emulsifiers that have demonstrated utility in the emulsions of this invention are fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Blends of these materials as well as other emulsifiers can be used for this application. Novamul and Versacoat are emulsifiers manufactured and distributed by M-I Drilling Fluids Company, Hypermer-D-477 and E-464 are emulsifiers manufactured by ICI Corp.

The oil based drilling fluid compositions of this invention may contain an additional chemical known as a wetting agent. Various wetting agents are available and can be included in the compositions. The wetting agents included, but not limited to the present invention, are fatty acids, crude tall oil, oxidized crude tall oil, organic phosphate esters, modified imidazolines, amido-amines, alkyl aromatic sulfates and sulfonates and the like and combinations of the above. Novawet and Versawet are wetting agents manufactured and distributed by M-I Drilling Fluids Company.

Organophilic clays, normally amine treated clays, are also used as viscosifiers in the oil based drilling fluid composition of the present invention. Other viscosifiers, such as oil soluble polymers, polyamide resins, polycarboxylic acids and fatty acid soaps can also be used. The amount of viscosifier used in the composition can vary depending upon the end use of the composition. However, normally about 0.1% to 10% by weight range are sufficient for most applications. VG-69 is an organoclay material and Versa HRP is a polyamide resin material manufactured and distributed by M-I Drilling Fluids Company.

The drilling fluid composition of this invention may optionally contain a weight material. The quantity depends upon the desired density and viscosity of the final composition. The preferred weight materials include, but are not limited to, barite, iron oxide, calcium carbonate and the like. The weight material is typically added to result in a drilling fluid density of up to 24 pounds per gallon, preferably up to 21 pounds per gallon and most preferably up to 19.5 pounds per gallon.

Finally, fluid loss control agents such as modified lignite, polymers, oxidized asphalt and gilsonite can be added to the drilling fluid system of this invention.

The following examples are submitted for the purpose of illustrating the toxicity and performance characteristics of the drilling fluid compositions of this invention. These tests were conducted in accordance with the procedures in API Bulletin RP 13B-2, 1990. The following abbreviations are sometimes used in describing the results of experimentation:

"PV" is plastic viscosity which is one variable used in the calculation of viscosity characteristics of a drilling fluid.

"YP" is yield point which is another variable used in the calculation of viscosity characteristics of drilling fluids.

"GELS" is a measure of the suspending characteristics and the thixotropic properties of a drilling fluid.

"ES" is the term used to indicate the stability of an emulsion.

"HTHP F.L." High Temperature High Pressure Fluid Losses are in ml.

To determine the toxicity of the drilling fluid compositions of the present invention, the bioassays were conducted using the suspended particulate phase ("SPP") of the drilling mud following the U.S. Environmental Protection Agency protocol in Appendix 3 of "Effluent Limitation Guidelines and New Source Performance Standards: Drilling Fluids Toxicity Test" Federal Register Vol. 50, No. 165, 34631–34636. The SPP is the unfiltered supernatant extracted from a 1:9 mixture of the test fluid and seawater which is allowed to settle for one hour. Synthetic seawater was used in preparing the SPP and the test negative controls. The 1:9 test sample/seawater slurry was prepared by stirring without aeration, 300 ml of the mud with 2700 ml of seawater in a clean, one gallon glass container for five minutes. The pH of the slurry was measured and adjusted to within 0.2 pH units of the seawater using 6N HCl. The slurry was then allowed to settle for one hour and the supernatant (SPP) was decanted. Aeration was not supplied to the 100% SPP since the dissolved oxygen level was more than 65% of saturation. The pH of the SPP was measured and further adjusted with 10% HCl. The definitive bioassay was conducted using the SPP. The definitive bioassay was initiated on test samples using test solutions of 20%, 10%, 5%, 1% and 0.5% SPP.

For the definitive test, 20 Mysid shrimp (Mysidopsis Bahia) were added to each of the concentrations of test solution (SPP) and to a seawater control. Water quality was measured and observations of the test animals were made at 24 hour intervals. After 96 hours, the test was terminated. A standard control test was also conducted utilizing the same test methods as used for the drilling mud. However, sodium dodecyl sulfate (95% pure) was used for the five test substance concentrations. The results of the bioassays are given as the $LC_{50}$ value for 96 hours.

EXAMPLE 1

The following are examples of drilling fluid compositions utilizing propylene glycol as an internal phase in synthetic hydrocarbon obtained from Ethyl Corporation (Ethylflow 162).

The material amounts are in grams.

| Materials | Composition 1 | Composition 2 |
|---|---|---|
| EthylFlow - 162 Oil | 138.82 | 138.82 |
| Lime | 4.0 | 4.0 |
| NOVAMUL (amido-amine emulsifier from M-I Drilling Fluids) | 4.0 | 4.0 |
| Hypermer D-477 (poly-alkalene carboxylate; ICI Corp.) | 6.0 | 6.0 |
| VG-69 (organophilic clay; from M-I Drilling Fluids) | 4.0 | 4.0 |
| Propylene Glycol | 81.0 | 65.0 |
| Water | — | 16.0 |
| Barite | 322 | 322 |

The following initial rheologies were obtained for these drilling fluid compositions. The rheologies were measured at room temperature.

| RPM Reading | 1 | 2 |
|---|---|---|
| 600 | 152 | 177 |
| 300 | 82 | 96 |
| PV | 70 | 81 |
| YP | 12 | 15 |
| Gels | 5/8 | 6/8 |

Composition 1 and Composition 2 were heat aged at 250° F. for 16 hours. The following rheologies were obtained. The rheologies were measured at room temperature.

| RPM Reading | 1 HA at 250° F. | 2 HA at 250° F. |
|---|---|---|
| 600 | 174 | 180 |
| 300 | 102 | 103 |
| PV | 72 | 77 |
| YP | 30 | 26 |
| Gels | 6/7 | 4/6 |

To the above composition was added 8.0 ppb organophilic clay as active solids. Then it was heat aged at 300° F. for 16 hours. The following rheologies were obtained. Rheologies were measured at 150° F.

| RPM Reading | 1 | 2 |
|---|---|---|
| 600 | 161 | 185 |
| 300 | 92 | 110 |
| PV | 69 | 75 |
| YP | 23 | 35 |
| Gels | 5/7 | 8/10 |

The above results indicate that the practical drilling fluid can be prepared from synthetic hydrocarbon using propylene glycol as internal phase.

EXAMPLE 2

To establish the tolerance of contamination of $CaCl_2$ and use of higher viscosity synthetic hydrocarbon the following composition was prepared and tested:

| Composition #3 | |
|---|---|
| Chevron PAO-4 (polyalpha-olefine 4.0 cst from Chevron) | 160 g |
| Propylene Glycol | 70 g |
| Hypermer D-477 | 9.0 g |
| NOVAMUL | 4.0 g |
| Dimer Acid | 1.5 g |
| Lime | 2.0 g |
| VG-69 | 4.0 g |
| Barite | 294 g |

The above composition was heat aged at 150° F. for 16 hours. Then the rheologies were measured at 120° F.

| | |
|---|---|
| 600 | 185 |
| 300 | 95 |
| pv | 90 |
| yp | 5 |
| Gels | 3/4 |

To the above composition it was added 15.0 ml of brine (30% $CaCl_2$) to provide brine contamination. The contaminated fluid was then heat aged at 300° F. for 16 hours. The rheologies were measured at 150° F.

| | |
|---|---|
| 600 | 109 |
| 300 | 58 |
| PV | 51 |
| YP | 7 |
| Gels | 3/4 |
| E.S. | 1580 |
| HTHP F.L. | 1.5 ml |

EXAMPLE 3

The following composition was prepared to study the rheological properties under high temperature and high pressure using PAO-4 as continuous phase and propylene glycol as internal phase.

| Composition #4 | |
|---|---|
| PAO-4 | 160 g |
| Propylene Glycol | 75 g |
| Hypermer D-477 | 8.0 g |
| NOVAMUL | 5.0 g |
| Lime | 2.0 g |
| VG-69 | 6.0 g |
| Alcomer D-247 (Allied Colloid viscosifier) | 4.0 g |
| Dimer Acid | 1.5 g |
| Brine (30% $CaCl_2$) | 9.0 g |
| Barite | 347 g |

The above composition was heat aged at 150° F. for 16 hours and mixed on high shear Silverson mixer for 5 minutes. The following rheological properties were obtained at 150° F.

| | |
|---|---|
| 600 | 198 |
| 300 | 110 |
| PV | 88 |
| YP | 22 |
| Gels | 7/28 |
| E.S. | 1780 |

Figure 2:
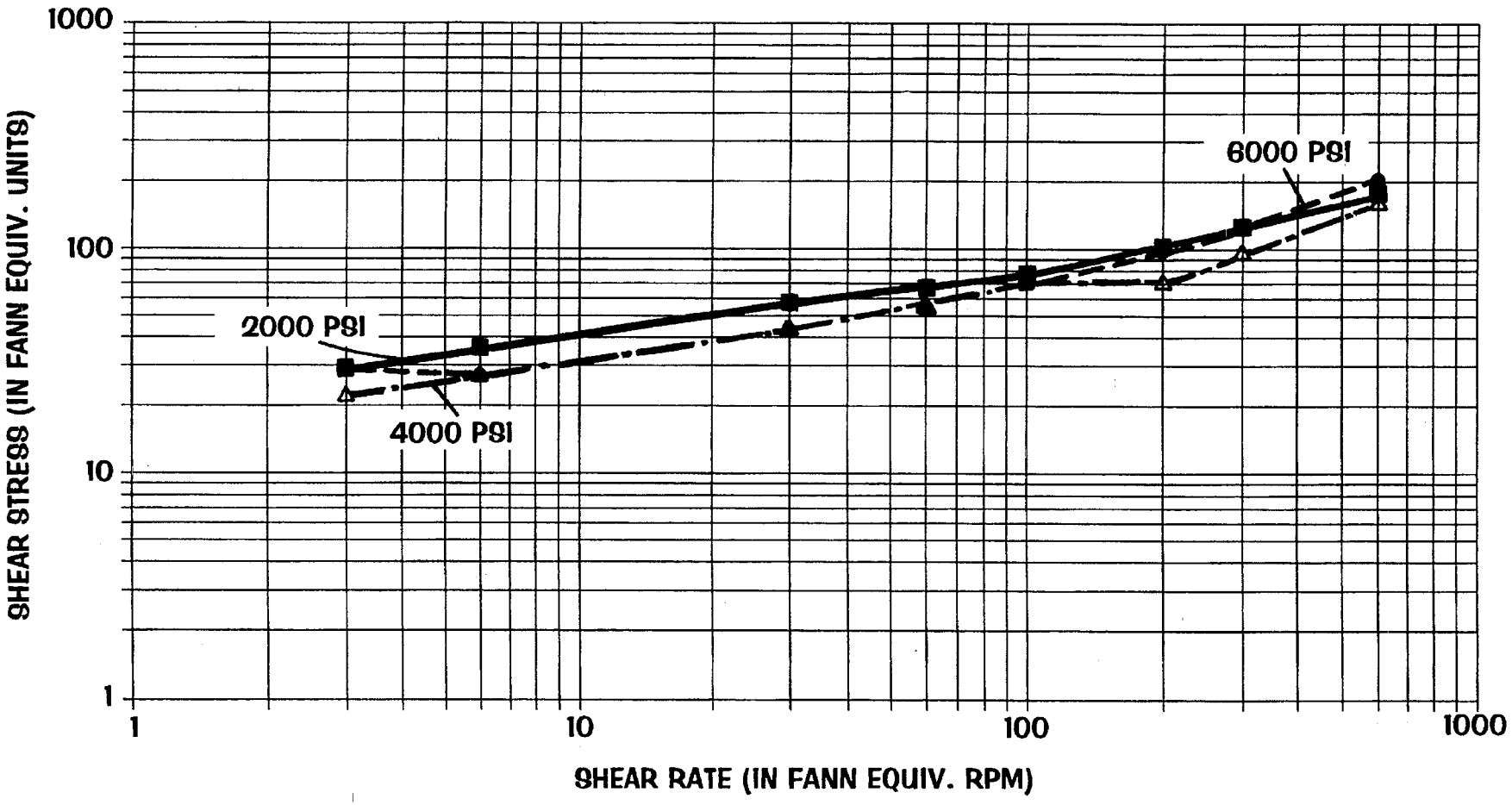
Figure 3:
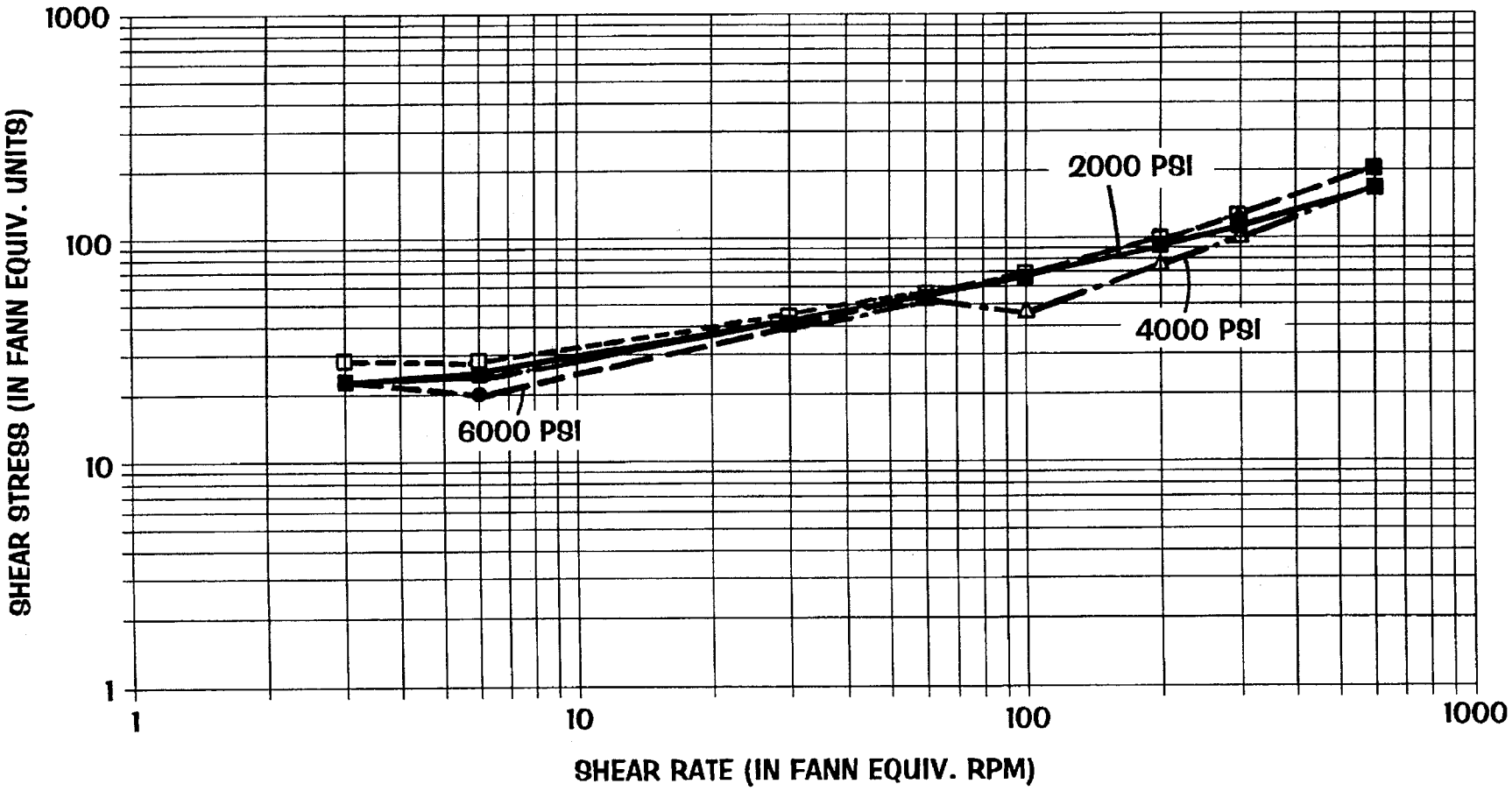

The above drilling fluid was used for studying high temperature high pressure rheology profile using Huxley-Bertram viscometer. Data from a plot of the shear stress versus shear rate at various pressures was measured by the Huxley-Bertram viscometer. Various high temperature tests were made and recorded in FIG. 1, FIG. 2 and FIG. 3. The Composition #4 responded to temperature and pressure conditions encountered in drilling oil and gas wells in a predictable manner similar to conventional oil-based muds.

EXAMPLE 4

The following composition was prepared to demonstrate the use of polyhydroxy organic compounds (glycerine) in a synthetic hydrocarbon invert system.

| Composition #5 | |
|---|---|
| EthylFlow-162 | 190.0 |
| Glycerine | 57.0 |
| Lime | 4.0 |
| VG-69 | 8.0 |
| NOVAMUL | 5.0 |
| Hypermer D-477 | 4.0 |
| Barite | 227.0 |

The following rheological data were obtained initially for this formulation. The rheologies were measured at room temperature.

| | |
|---|---|
| 600 | 70 |
| 300 | 35 |
| PV | 35 |
| YP | 0 |
| Gels | 2/3 |

To the above formulation was added 10. g water, 45 g REVDUST, 4.0 g VG-69 and 2.0 grams VERSA-HRP (polyamide viscosifier from M-I Drilling Fluids Co.)

The following initial and heat aged rheologies were obtained. The rheologies were measured at room temperature.

| | Initial | HA 250° F./16 Hours |
|---|---|---|
| 600 | 176 | 179 |
| 300 | 94 | 95 |
| PV | 82 | 84 |
| YP | 12 | 11 |
| Gels | 4/12 | 4/10 |
| E.S. | 700 | 410 |
| Settling | No | No |

The above results establish that polyhydroxy organic compounds can be used as the internal phase in a synthetic hydrocarbon system. The systems respond normally to water and drill solids contaminations.

EXAMPLE 5

The following formulation was prepared to demonstrate the use of glycerine as internal phase in synthetic hydrocarbon system with high brine contamination.

| Composition #6 | |
|---|---|
| EthylFlow 162 | 88 g |
| Glycerine | 90.0 g |
| Brine (30% $CaCl_2$) | 120 g |
| Lime | 4.0 g |
| NOVAMUL | 5.0 g |
| NOVAWET (Immidazoline marketed by M-I Drilling Fluids Co.) | 2.0 g |
| Hypermer D-477 | 4.0 g |
| VG-69 | 2.0 g |
| Barite | 200 g |

The above formulation was heat aged at 250° F. for 16 hours. The rheologies were measured at 120° F.

| | |
|---|---|
| 600 | 217 |
| 300 | 131 |
| PV | 86 |
| YP | 45 |
| Gels | 7/9 |
| HTHP | 11.0 ml |
| E.S. | 400 |

Toxicity Data

Composition #4 and Composition #6 had 96 hour $LC_{50}$ values of greater than 1,000,000 ppm and 348,000 ppm respectively. This data establishes that the drilling fluid compositions of this invention are relatively non-toxic when compared with present state-of-the-art oil-based drilling fluids.

What is claimed is:

1. An improved emulsion for an oil-based drilling fluid, said emulsion comprising a glycol emulsified in a synthetic hydrocarbon material, said synthetic hydrocarbon material having an average molecular weight of from about 120 to about 1000 and being synthesized from one or more olefinic monomers having a chain length of $C_2$ to $C_{14}$.

2. The improved emulsion for an oil based drilling fluid of claim 1 wherein said synthetic hydrocarbon oil comprises branched chain oligomers synthesized from one or more clefins containing a $C_2$ to $C_{12}$ chain length and wherein the oligomers have an average molecular weight of from 160 to 800.

3. The improved emulsion for an oil based drilling fluid of claim 1 wherein said synthetic hydrocarbon oil comprises branched chain oligomers synthesized from one or more olefins containing a $C_2$ to $C_{10}$ chain length and wherein the oligomers have an average molecular weight of 200 to 600.

4. The improved emulsion for an oil based drilling fluid of claim 1 wherein the viscosity of said oil is from 1.0 to 6.0 centistokes when measured at 212° F.

5. The improved emulsion for an oil-based drilling fluid of claim 1 wherein said synthetic hydrocarbons are selected from the group consisting of oligomers of: ethylene, propene, butene-1, isobutene, hexene, heptene, octene, nonene, decene, dodecene and combinations thereof.

6. The improved emulsion for an oil based drilling fluid of claim 1 wherein said synthetic hydrocarbons is polydecene.

7. The improved emulsion of claim 1 wherein said glycol is selected from the group consisting of: propylene glycol, glycerine, water soluble polyol and combinations thereof.

8. The improved emulsion of claim 1 further including a weight material.

9. The improved emulsion for an oil-based drilling fluid of claim 8 wherein said weight material is selected from the group consisting of: barite, iron oxide, calcium carbonate, and combinations thereof.

10. A drilling fluid comprising:

(a) an improved continuous phase, said continuous phase comprising a synthetic hydrocarbon oil, said synthetic hydrocarbon oil having an average molecular weight of from about 120 to about 1000 and being synthesized from one or more olefinic monomers having a chain length of $C_2$ to $C_{14}$;

(b) a glycol material emulsified in said synthetic hydrocarbon oil; and (c) a weight material.

11. The drilling fluid of claim 10 wherein said drilling fluid contains up to 70% glycol by volume.

12. The drilling fluid of claim 10 wherein said glycol material contains up to 80% water by volume.

13. The drilling fluid of claim 10 including said improved continuous phase wherein said drilling fluid further contains an emulsifier.

14. The drilling fluid of claim 13 wherein said emulsifier is selected from the group consisting of: fatty acids, soaps of fatty acids, amido-amines, polyamides, polyamines, oleate esters, imidazolines, alcohols, polyalkylene carboxylate and combinations thereof.

15. The drilling fluid of claim 13 wherein said emulsifier is present at a concentration of up to 10% by weight.

16. The drilling fluid of claim 10 further comprising a wetting agent.

17. The drilling fluid of claim 16 wherein said wetting agent is selected from the group consisting of: crude tall oil, oxidized crude tall oil, organic phosphate esters, imidazolines, alkyl aromatic sulfonates and combinations thereof.

18. The drilling fluid of claim 10 further comprising a viscosifier.

19. The drilling fluid of claim 18 wherein said viscosifier is selected from the group consisting of: organophilic clays, oil soluble polymers, polycarboxylic acid, soaps and combinations thereof.

20. The drilling fluid of claim 10 wherein said weight material is selected from the group consisting of: barite, iron oxide, calcium carbonate and combinations thereof.

21. The drilling fluid of claim 10 wherein said glycol is selected from the group consisting of: propylene glycol, glycerine, water soluble polyol and combinations thereof.

22. A drilling fluid, said drilling fluid including an improved continuous phase, said drilling fluid comprising:

(a) a continuous phase comprising a synthetic hydrocarbon, said synthetic hydrocarbon having an average molecular weight of from about 120 to about 1000 and being synthesized from one or more olefinic monomers having a chain length of $C_2$ to $C_{14}$;

(b) a glycol-in-oil emulsifier;

(c) a glycol emulsified in said synthetic hydrocarbon oil;

(d) an aqueous phase, said aqueous phase comprising up to about 80% of glycol by volume; and (e) a weight material.

* * * * *